United States Patent [19]

Löfgren et al.

[11] Patent Number: 4,605,302
[45] Date of Patent: Aug. 12, 1986

[54] CLOUD HEIGHT MEASURING DEVICE WITH COMPENSATION FOR WINDOW FOULING

[75] Inventors: Folke Löfgren; Sven-Erik Söderström, both of Västerås, Sweden

[73] Assignee: Asea Aktiebolag, Västerås, Sweden

[21] Appl. No.: 600,768

[22] Filed: Apr. 16, 1984

[30] Foreign Application Priority Data

Apr. 18, 1983 [SE] Sweden .................. 8302152

[51] Int. Cl.⁴ ............................... G01C 3/08
[52] U.S. Cl. ............................ 356/5; 356/4
[58] Field of Search ............... 356/4, 5; 343/17.1 R

[56] References Cited

U.S. PATENT DOCUMENTS

| | | | |
|---|---|---|---|
| 3,741,655 | 6/1973 | Ling et al. | 356/5 |
| 3,815,994 | 6/1974 | Peekham | |
| 3,947,131 | 3/1976 | Karl | |
| 4,121,889 | 10/1979 | Söderström | 356/5 |

FOREIGN PATENT DOCUMENTS 2833635  2/1980  Fed. Rep. of Germany .
1395113  5/1975  United Kingdom .

OTHER PUBLICATIONS

Ludbrook and Winstanley, "The Laser Ceilometer," Systems Technology, Jun. 1977, No. 26.

Primary Examiner—Stephen C. Buczinski
Assistant Examiner—M. Koltak
Attorney, Agent, or Firm—Watson Cole Grindle & Watson

[57] ABSTRACT

In a cloud height measuring device, the attenuation caused by deposits on the output and/or receiver windows of the device (e.g. by rain and/or dirt) are compensated for by measuring the degree of reflection of light from the window(s) when illuminated by light pulses. By means of a special measuring sequence in a processor unit included in the cloud height measuring device, light pulses separate from those used for the cloud height measurement itself, can be employed to assess the extent of the fouling. The measurement energy can then be controlled during the cloud height measurement proper, so that the total attenuation, caused by rain and dirt on the windows, is properly compensated for.

12 Claims, 1 Drawing Figure

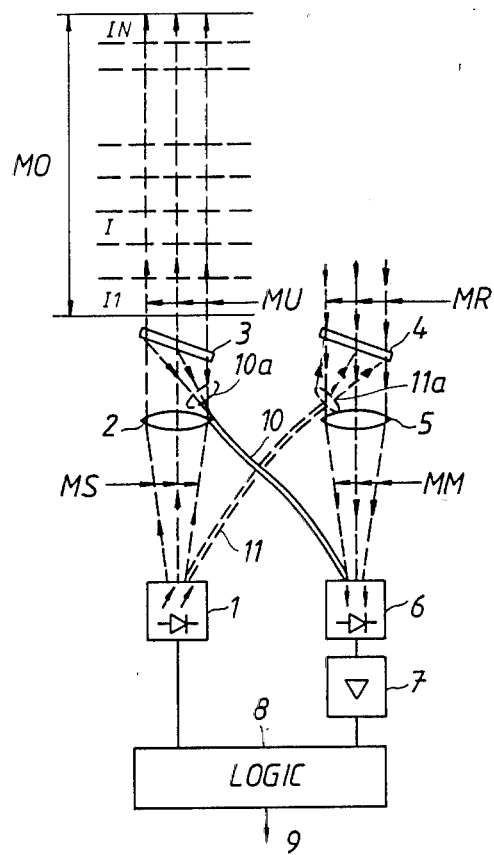

CLOUD HEIGHT MEASURING DEVICE WITH COMPENSATION FOR WINDOW FOULING

BACKGROUND OF THE INVENTION

1. Field of the Invention

This invention relates to a device for measuring cloud height which operates according to the principle of an optical radar by determining the level at which reflections or echo signals are obtained from water droplets in the atmosphere and using such determinations to indicate the existence of a cloud. The transit time between a light pulse being emitted from the device and the receipt of an echo signal from the atmosphere indicates the level above the device (and thus the height) of the cloud.

Cloud height measuring devices of the type described can also be used where the visibility is impaired but the concentration of water droplets in the atmosphere is not high enough to define cloud conditions. However to classify the visibility in the case of mist it is necessary to know accurately what is the level of attenuation in the light pulses reflected from a particular height so that the vertical visibility in the case of mist can also be calculated.

The transmitter and receiver of a device to which this invention relates are accommodated in a so-called transceiver, which also includes the necessary optical and electronic equipment. The emitted light passes upwards through an output window in a protective housing of the transceiver and the reflected light passes downwardly through a receiver window in the same housing before it is led to a signal detector via a receiver optic. Pollution and/or water droplets on either of the windows of the housing cause the light pulses to be attenuated to varying degrees and make it difficult or impossible to correctly identify the echo signals from a cloud or the determination of the visibility in the case of mist.

The present invention relates to a method for controlling the emitted measurement energy in a cloud height measuring device such that signal attenuation caused by rain and/or dirt on a window of the device is compensated for, and also to a device for carrying out the method.

2. Description of the Prior Art

The determination of cloud height by measuring transit time is performed by measuring the time from the emission of an incident light pulse until reflections exceeding specified amplitude are received back at the receiver. During its transit, the light pulses are scattered and attenuated by obstacles of different kinds, which results in the received measurement energy being considerably lower than the emitted energy. When a transmitter of inherently low power output is used, for example a pulsed GaAs laser, some form of signal filtering is required for detecting clouds within the height range that is of interest in the particular case of aircraft flights.

When the measurement energy in the received reflections becomes low, it may be difficult to distinguish the measuring signal from other signal noise. To be able to perform reasonably reliable measurements in a low signal to noise ratio, it is, for example, possible to employ the method described in U.S. Pat. No. 3,741,655. This method comprises dividing the measurement range into a number of height intervals or levels. Because it is possible to calculate the transit time for a measurement pulse up to any given level and back to the receiver, a measurement of reflected energy can be carried out at the precise moment when a reflection would be expected if a cloud (or some other reflecting object) is present at that given level. Any measuring signal taken at the indicated moment will comprise both a reflection signal and a noise signal. By performing a similar measurement just before the looked-for reflection signal is due, a value is obtained which represents the noise level only. A number of such measurements can be integrated in separate integrators, the output signals of which are finally compared. If a significant difference is observable between receiver output during the time when reflections are expected and during times when they are not, this signifies that a cloud is present within the height interval under consideration. Since the signal-to-noise ratio increases with the square root of the number of integrated measuring pulses, it is possible, despite the limitations of low transmitter power, to detect a cloud at a relatively great height by integrating a sufficiently large number of measuring pulses for each height interval of interest.

The above-discussed method of measuring cloud height is based on a measuring sequence with a fixed time-controlled sensitivity regulation and/or with a fixed level of emission of measurement energy.

TECHNICAL PROBLEM

Attenuation of the emitted measurement energy reflected back to the receiver arises mainly because of water droplets in the air space between the transmitter and the cloud because of water droplets and/or a film of dirt on the transmitter and/or receiver windows of the device.

Experimental evidence indicates that the water droplets which accumulate on the windows during rain can attenuate the cloud echo signals by up to 20 times. In the case of a sensitivity control which is fixed at a given value, this change in attenuation must be taken into consideration, otherwise too high a sensitivity, with erroneous height measurement, will occur in certain types of weather and too low a sensitivity may occur during heavy precipitation, when clouds might not even be detected.

OBJECTS OF THE INVENTION

One object of the invention is to compensate for the attenuating effect, caused by rain and/or dirt on the transmitter and/or receiver windows on the emitted and received measurement energy of a cloud-height measuring device. A further object is to accurately separate a cloud echo from other echo signals and enable the measuring range of such a device to be extended within the same measuring time and, therefore, also in total. A still further object of the invention is to reduce the dynamic range of the detector of the device, which results in a better as well as a cheaper detection system.

SUMMARY OF THE INVENTION

The window glass which is used in the transceivers of a measuring device of the above kind is normally provided with a non-reflective coating in order not, by itself, to give rise to attenuation of the light signals to any significant extent. However the attenuation caused by any fouling coating which forms on the windows is not automatically compensated for in the prior art devices.

What constitutes the invention in both its method and equipment aspects can be taken from the appended independent claims. Viewed in a broad aspect the method according to the invention comprises increasing the measurement energy radiating from the transmitter to such an extent that it compensates for the total attenuation caused by the fouling on either or both of the output and receiver windows. The compensation is automatic and is controlled by a measurement of the reflection occurring at one or both of the windows.

BRIEF DESCRIPTION OF THE DRAWING

The single FIGURE of the drawing shows, purely schematically, and by way of example, one embodiment of a cloud height measuring device according to the invention.

The device illustrated comprises a transmitter 1 for pulses of laser energy, an optic 2 for forming pulses of laser energy into parallel beams and an output window 3. On the receiver side, the device illustrated includes a receiver window 4, a receiver optic 5, a receiver 6 and a signal detector 7. A processor unit 8 comprises electronic equipment which, among other things, controls the height measuring process, triggers the laser transmitter 1, evaluates the reception time of the echo signal and converts these into measurement data which leaves on a line 9 leading to a printer (not shown) and/or a digital display (not shown). The illustrated device also includes a light guide 10 which optionally includes a lens 10a.

DESCRIPTION OF A PREFERRED EMBODIMENT

The device schematically shown in the drawing and its mode of operation will now be described. The illustrated cloud height measuring device makes use of the principles of optical radar and includes, as an integral part of the device, means for monitoring the fouling of either or both of the windows ¾ e.g. by rain or a partially occluding film.

On the basis of timing signals received from the unit 8, the transmitter 1 generates pulses of laser energy which are directed upwardly through the output window 3 of the device. The lens 2 collimates the bursts of output energy into parallel beams and the wavelength of the laser light is chosen to have good transmission through the optic 2, the window 3 and the atmosphere but to suffer significant reflection by water droplets in the atmosphere such as form visibility-impairing mist or cloud.

Except under ideal visibility conditions, some reflection of the upwardly travelling pulses of laser energy will occur at one or more levels above the device so that the adjacent receiver window 4 will be traversed by reflected energy which, via the optic 5 is focussed onto the receiver 6. The receiver 6 is a photon-electric transducer and thus generates an electrical output in response to the reflected laser beams which impinge upon it. The electrical output from the receiver 6 is fed to the detector 7 which supplies pulses to the unit 8.

Cloud height is determined on the basis of the transit time between a pulse being emitted from the transmitter 1 and its reflection being received by the receiver 6. The range of heights over which the illustrated device can operate satisfactorily is indicated at MO in the drawing and the different levels within this range are indicated by the dash lines I, I1 being the lowest level at which a practical assessment can be made and IN the highest level in the range MO.

MU represents the light intensity just above the output window 3 and MR the light intensity just above the receiver window 4. The light intensities just above the transmitter 1 and receiver 6 are, respectively, MS and MM.

Of the measurement energy MS emitted from the transmitter 1 the measurement energy MU remains after the pulse has passed the window 3 coated with rain and/or dirt. Because of this external coating of rain and/or dirt on the window 3 some light reflection will be caused by this coating. The relationship between MU and the reflected light at different values of MS can be empirically determined. This means that, with a knowledge of the current value of MS and of the current reflected value, the attenuation caused by the window 3 or the output energy level MU can be determined. This also makes available a possibility for controlling the level of MS, via the reflection measurement, so that MU becomes substantially constant at all times and thus becomes independent of the degree of fouling of the window 3.

In the arrangement shown in the drawing, reflections from any coating present on the outside of the transmitter window 3 are measured. Since the separation between the transmitter and receiver windows is small, it is reasonable to assume that the degree of fouling is the same on both windows and it is thus sufficient to measure the reflection level with respect to just one.

In an integrated arrangement as shown in the drawing, the transmitter 1 and the receiver 6 are used to find out whether fouling has occurred and if so towhat degree. The light reflected back from the outer surface of the output glass 3 is collected and fed into a light guide 10 (e.g. via a lens 10a) and thus led direct to the receiver 6. The processor unit 8 is supplemented with a program which provides a special measuring sequence for this reflection measurement and for the further processing of this signal. Measurement of reflections from the window 3, controlled by the measuring sequence, is suitably arranged to take place before the cloud height measurement itself, so that it is completed before the earliest reflected signal from level I1 is expected and in this way to ensure the cloud height measurements are not disturbed. It is however, possible to make the assessment of level of reflection from the window at other times e.g. after a cloud height measurement has been made. The method according to this invention implies that the measured reflection signal, representing the degree of fouling of the window, is used, via the processor unit, to control the energy of the light pulses emanating from the transmitter 1, so that the total attenuation caused by rain and/or dirt on the window 3 is properly compensated for.

Put simply, therefore, the method for controlling emitted measurement energy from a cloud height measuring means during cloud height measurement, in which from a transmitter 1 in the cloud height measuring means through a transmitter window 3 there is emitted a measuring signal MS containing a certain measurement energy in the form of a train of pulses, and which cloud height measurement comprises a measuring range MO divided into a number of height intervals or levels I, starting at the first height intervals I1 nearest the ground and up to the last height interval IN at the end of the measuring range, whereby the pulse train is emitted towards the height level which is to be inspected and that reflected measuring signals from each one of the height levels are measured and integrated via a receiver window 4 and a receiver 6. The method is characterized in that the windows are regularly sensed as regards rain and/or fouling by means of reflection measurement from the windows by means of the transmitter 1 and receiver 6 of the cloud height measuring means itself and that the emitted measurement energy MS for cloud height measurement is controlled with the aid of this measurement by changing the time and thus the pulse number and/or the pulse frequency and/or the pulse energy for each height interval in such a way that the total damping of measurement energy due to a coating on the transmitter window, that is, the damping of the measurement energy from MS to MU, and the receiver window, that is, the damping of the measurement energy from MR to MM, is compensated for by a corresponding increase of the measurement energy given off by the transmitter.

The control method and device according to the invention are not restricted to the illustrated embodiment described above but can be modified in many ways within the scope of the following claims.

Thus, for example, a measurement of the degree of reflection occurring at both the output and the receiver windows, or only on the receiver window can be conducted or even measurements can be made just at the location of the receiver window 4. For this latter arrangement a light guide 11 (optionally with a lens 11a) can be used to pass light from the transmitter 1 for the illumination, from below, of the receiver window 4, the reflected light then being fed down to the receiver 6 via the lens 5.

What is claimed is:

1. A method for controlling the energy of measurement pulses emitted from a cloud height measuring device during cloud height measurement, in which the measurement pulses from a transmitter of the cloud height measuring device are passed through an output window of the device and after reflection at a given height above the said output window are reflected back to a receiver in the device via a receiver window, characterized in that at least one of said windows is regularly monitored as regards surface fouling by means of measuring the level of energy reflected from the said window using the transmitter and receiver of the cloud height measuring device and in that the emitted energy of the measurement pulses used for cloud height measurement is controlled with the aid of this measurement whereby the attenuation of the measurement pulses transmitted throught the output window is compensated for by a corresponding increase of the measurement energy output from the transmitter.

2. A method according to claim 1, in which said at least one window is regularly sensed as regards surface fouling by means of a reflection measurement from said at least one window using the transmitter and receiver of the cloud height measuring device before the normal cloud height measurement procedure of the measuring device is effected.

3. A method according to claim 1, in which the output window is regularly monitored for surface fouling by passing energy reflected from the output window via a light guide to the receiver.

4. A method according to claim 3, in which the light guide is used with a lens.

5. A method according to claim 1, in which the receiver window is regularly monitored for surface fouling by passing part of the output from the transmitter via a light guide to the receiver window.

6. A method according to claim 5, in which the light guide is used with a lens.

7. A method according to claim 1, in which both the output and receiver windows are regularly monitored for surface fouling by means of reflection measurements conducted on each window using the transmitter and receiver of the cloud height measuring device itself by passing reflections from the output window via one light guide to the receiver and by also passing a part of the measuring signal, via a further light guide to the receiver window.

8. A method according to claim 1, in which the measurement energy output from the transmitter is controlled by at least changing one of the time and thus the pulse number, the pulse frequency and the pulse energy for each height interval of the cloud height measurement.

9. In a cloud height measuring device in which during a cloud height measurement, a measuring signal containing a certain measurement energy in the form of a train of pulses is emitted from a transmitter through an output window and in which a cloud height measurement is effected in a measuring range divided into a number of height intervals from the lowest height interval up to the highest interval at the top of the measuring range, whereby the pulse train of measurement energy is emitted towards the height level that is to be examined, and reflected measuring signals from each one of the height levels are measured and integrated via a receiver window and a receiver in the device, the improvement which comprises including in the device members for a regular monitoring in the form of a reflection measurement of fouling on the said windows, these members consisting of the transmitter and receiver of the cloud height measuring device itself, this reflecting measurement being adapted to control the transmitter by changing at least one of the time and thus the pulse number, the pulse frequency and the pulse energy for each height interval in such a way that the emitted measurement energy for any given cloud height measurement is compensated for the attenuation of measurement energy occurring due to the coating on the output and receiver windows.

10. A measuring device according to claim 9, in which the members for regular monitoring in the form of reflection measurement fouling on the windows comprise at least one light guide which passes reflected light from the output window to the receiver.

11. A measuring device according to claim 9, in which the members for regular monitoring in the form of reflection measurement of fouling on the windows comprise at least one light guide which passes part of the measuring signals to the receiver window for measurement of the fouling on the receiver window.

12. A measuring device according to claim 9, in which the members for regular monitoring in the form of reflection measurment of fouling on the windows comprise a first light guide which passes reflected light from the output window to the receiver and a second light guide which passes part of the measuring signal to the receiver window for measurement of the fouling on the receiver window.

* * * * *